United States Patent
Stricker et al.

(10) Patent No.: US 6,472,089 B1
(45) Date of Patent: Oct. 29, 2002

(54) BOTTOM COVER DESIGN FOR BATTERY WITH REVERSE PROTECTION

(75) Inventors: James C. Stricker, Hinckley, OH (US); Thomas J. Kmetich, Willoughby Hills, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 147 days.

(21) Appl. No.: 09/592,962

(22) Filed: Jun. 13, 2000

(51) Int. Cl.[7] ................................................ H01M 2/00
(52) U.S. Cl. ........................ 429/1; 429/178; 429/179; 429/181; 429/185; 429/186; 429/157; 429/160; 429/163; 429/164; 429/167; 429/168; 429/169; 429/170; 429/120
(58) Field of Search .......................... 429/1, 178, 179, 429/181, 185, 186, 164, 160, 157, 163, 167–170, 120

(56) References Cited

U.S. PATENT DOCUMENTS

| | | |
|---|---|---|
| 389,676 A | 9/1888 | Trippe |
| 572,438 A | 12/1896 | Moffat |
| 1,249,268 A | 12/1917 | Willard |
| 1,529,703 A | 3/1925 | Jones |
| 2,544,115 A | 3/1951 | Wagner |
| 3,480,481 A | 11/1969 | Gauthier |
| 3,676,221 A | 7/1972 | Bach |
| 3,856,577 A | 12/1974 | Oki et al. |
| 4,002,808 A | 1/1977 | Fafa |
| 4,079,172 A | 3/1978 | Potts et al. |
| 4,595,641 A | 6/1986 | Giurtino |
| 4,751,150 A | 6/1988 | Oogita et al. |
| 4,822,377 A | 4/1989 | Wolff |
| 4,871,628 A | 10/1989 | Parker |
| 5,173,371 A | * 12/1992 | Huhndorff et al. ............. 429/1 |
| 5,362,577 A | 11/1994 | Pedicini |
| 6,004,687 A | * 12/1999 | Iwaki et al. ................... 429/1 |

FOREIGN PATENT DOCUMENTS

| | | |
|---|---|---|
| JP | 9 506958 | 3/1995 |
| JP | 9 601505 | 1/1996 |
| JP | 09 161762 | 6/1997 |

\* cited by examiner

*Primary Examiner*—Patrick Ryan
*Assistant Examiner*—Angela J. Martin
(74) *Attorney, Agent, or Firm*—Russell H. Toye, Jr.

(57) ABSTRACT

An electrochemical cell is provided that has a negative terminal cover with a hole therein or a raised portion with notches therein to provide adequate air ingress during the coating of a non-conductive material on the raised portion of the negative terminal. The addition of the hole or notches in the negative terminal cover prevents a vacuum from forming and thereby prevents migration of the non-conductive material toward the center of the negative terminal cover. The process of making an electrochemical cell with a negative terminal cover that has a hole therein or has a raised portion with notches therein is also provided.

31 Claims, 3 Drawing Sheets

BOTTOM COVER DESIGN FOR BATTERY WITH REVERSE PROTECTION

BACKGROUND OF THE INVENTION

The present invention relates to electrochemical cells and more particularly to electrochemical cells having at least one terminal that prevents the flow of electrical current between that electrochemical cell and another adjacent electrochemical cell aligned in an end-to-end configuration and positioned in the reverse direction relative to the other.

Most conventional electrochemical cells are cylindrical in shape and have a positive terminal at one end and a negative terminal at the other end of the cylindrically shaped housing. Many devices, such as flashlights, require multiple cells, often in a straight-line configuration with the negative terminal of one electrochemical cell contacting the positive terminal of another electrochemical cell. Even though most conventional electrical devices have directions of how to insert the electrochemical cells into the device, occasionally an electrochemical cell is inserted in the reverse direction from that which is intended and proper. This is commonly referred to as cell reversal. The primary danger associated with cell reversal is the possible charging of the reversed cell by two or more other cells during discharge. Such charging can lead to an increase in internal pressure due to the generation of hydrogen gas and may lead to the activation of the safety vent of the electrochemical cell, from which electrolyte or other internal components of the electrochemical cell can leak.

Various attempts have been made to reduce or eliminate the negative effects of cell reversal. Once such approach was taken in U.S. Pat. No. 5,173,371 to Huhndorff et al. The Huhndorff et al. patent discloses a terminal with an electrically non-conductive portion that is cooperatively positioned above an electrically conductive portion. The non-conductive portion may be masked with an electrically non-conductive resin. However, it has been found that during the process of applying the non-conductive material to the terminal, a vacuum was created between the terminal and the application roller. This vacuum caused the non-conductive material to migrate toward the center of the terminal, which is undesirable aesthetically as well as functionally.

Another such attempt to prevent the negative effects of cell reversal was made in Japanese Application No. 09161762 to Fuji Electrochemical Company Ltd. That application shows a battery with a flat surface having three insulated projections to provide a clearance between the flat surface and the negative electrode of another battery. However, with three small projections as shown in this Japan application, only a slight tilting of two cells relative to each other may cause the conductive portion of the terminals to touch. Also, the heights of the insulated projections are difficult to control during the manufacturing process, and if conveyed along a belt during manufacture, the projections may be partly abraded away.

There is a need for a method of making an electrochemical cell with cell reversal protection that has a means for reducing migration of the non-conductive material on the terminal of the electrochemical cell.

SUMMARY OF THE INVENTION

One aspect of the present invention is an electrochemical cell comprising a housing having a first end and a second end, a first terminal at the first end of the housing, and a second terminal at the second end of the housing, the second terminal having an a substantially flat portion and a raised portion, the uppermost part of which is insulated, and a passageway at or radially inward of the raised portion to allow air ingress to the radial center of the second terminal when a flat structure is placed against the second terminal parallel to the flat portion.

Another aspect of the present invention is an electrochemical cell comprising a housing having a first end and a second end, a first terminal at the first end of the housing, and a second terminal at the second end of the housing, with the second terminal having a substantially flat portion and a raised portion, the uppermost part of which is insulated, and an air ingress means for allowing sufficient air ingress to avoid migration of a non-conductive coating toward the center of the second terminal from the raised portion during application of the nonconductive material.

Yet another aspect of the present invention is an electrochemical cell comprising a housing having a first end and a second end, a first terminal at the first end of the housing, and a second terminal at the second end of the housing, the second terminal having an exterior surface with an electrically non-conductive raised portion having at least one notch therein.

Yet another aspect of the present invention is an electrochemical cell comprising a housing having a first end and a second end, a first terminal at the first end of the housing, and a second terminal at the second end of the housing, the second terminal having an exterior surface with an electrically non-conductive raised portion and at least one hole therein between the radial center of the second terminal and the raised portion. Yet another aspect of the present invention is a method of making an electrochemical cell comprising the steps of providing a housing having a first end and a second end, a first terminal, and a second terminal having a raised portion; providing at least one notch in the raised portion; coating the raised portion with an electrically insulating material; connecting the first terminal to the first end of the housing; and connecting the second terminal to the second end of the housing.

Still another aspect of the present invention is a method of making an electrochemical cell comprising the steps of providing a housing having a first end and a second end, a first terminal, and a second terminal having a raised portion; providing at least one hole in the second terminal positioned radially between the raised portion and the radial center of the second terminal or at the radial center; coating at least the uppermost part of the raised portion with an electrically insulating material; connecting the first terminal to the first end of the housing; and connecting the second terminal to the second end of the housing.

Yet another aspect of the present invention is an electrochemical cell comprising a cylindrical housing having a first end and a second end; internal components including an anodic material, a cathodic material, and an alkaline electrolyte in the housing; a positive terminal at the first end of the housing; and a negative terminal at the second end of the housing, the negative terminal having an exterior surface with a circular raised portion with a plurality of notches therein, the raised portion being covered by a non-conductive material.

These and other features, advantages and objects of the present invention will be further understood and appreciated by those skilled in the art by reference to the following specification, claims, and appended drawings.

DETAILED DESCRIPTION OF THE PREFERRED EMBODIMENTS

Figure 1:
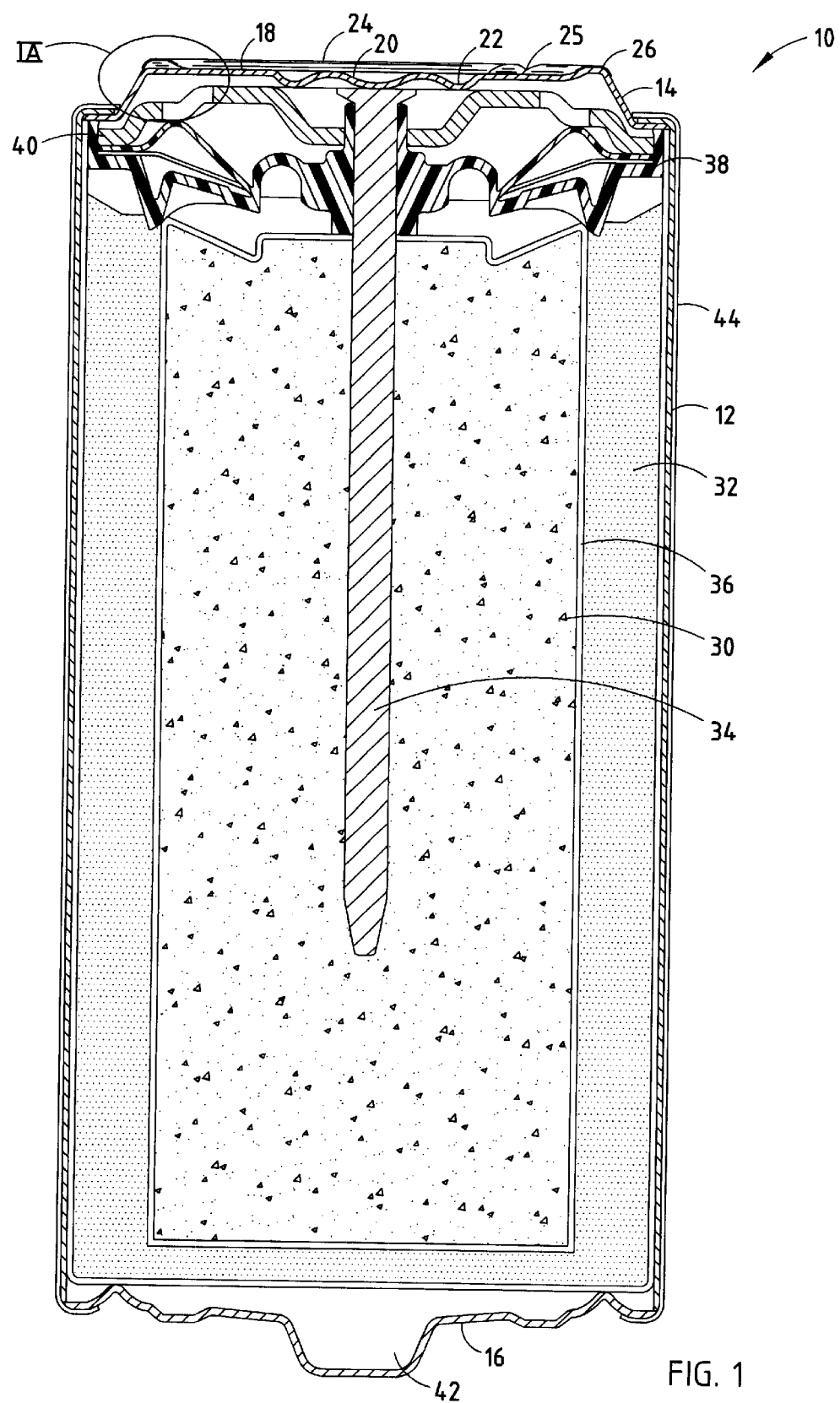
FIG. 1 is a cross-sectional view of an electrochemical cell with notches in the circular ridge in the negative terminal cover.

Electrochemical cells of the present invention have an electrically insulating portion on their negative terminal cover that prevents electrical current flow when two or more electrochemical cells are aligned end-to-end and two of the negative terminals are in contact with each other. However, when two or more of the electrochemical cells of the invention are placed end-to-end with a positive terminal of one contacting the negative terminal of the other, electrical current is allowed to flow through the cells. On terminals that are useful with electrochemical cells of the present invention, the exterior surface of the terminal should contain at least one electrically conductive portion and at least one electrically non-conductive portion.

Preferably, a majority of the exterior surface of the terminal will be electrically conductive so that a properly oriented and adjacent battery will have sufficient opportunity to contact the conductive portion of the terminal. The conductive portion of the terminal is defined to be that part of the terminal exterior surface that is not masked with an electrically non-conductive material. The electrically non-conductive portion of the terminal is defined to be that part of the terminal exterior surface that either comprises or is masked by an electrically non-conductive material. Cells of the present invention may be either primary or rechargeable and of any electrochemical system, preferably one with an alkaline electrolyte. Examples of electrochemical systems with alkaline electrolytes include zinc/manganese dioxide, nickel/cadmium, and nickel/metal hydride. The cells may be of any shape, such as cylindrical or polygonal in radial cross section, but are preferably cylindrical.

The non-conductive portion may be made from any configuration of electrically non-conductive material that prevents undesirable electrical contact with an adjacent cell. The non-conductive material is preferably a urethane, acrylate, or a curable epoxy. Most preferably, the non-conductive material is a 100% ultraviolet (UV) curable epoxy. An example of a 100% UV curable epoxy is Apscure 2008-195 from Applied Polymer Systems, Inc. Preferably, the electrically non-conductive material covers a raised portion of the negative terminal, where the raised portion is circular with notches as discussed below. The conductive portion and the non-conductive portion are cooperatively arranged so that the non-conductive portion extends above the conductive portion (as oriented in FIG. 1, for example). Thus, the non-conductive portion is defined to extend above the conductive portion so that only the non-conductive portion can contact a flat surface that has been placed parallel to and in contact with the exterior surface of the terminal. Preferably, the central area of the terminal exterior surface is electrically conductive and forms a part of the lower region while the electrically non-conductive part forms a part of a raised portion of the terminal and is radially outward from the conductive lower region. "Raised portion" means that part which is above the substantially flat portion of the terminal, as the terminal is oriented in FIG. 1. Preferably, the radial width of the raised portion is smaller than the distance between the raised portion and the radial center of the terminal. In a preferred embodiment, for maximum reliability, the central conductive portion of the terminal is completely surrounded by the raised portion except for any notches in the raised portion. Therefore, it is desired that the size of the notches be minimized, so that the total length of the upper most part, i.e. about the top 10% vertically of the radial portion that is notched, is no more than 50% of the total length of the upper most part of the raised portion including the notches.

Figure 1A:
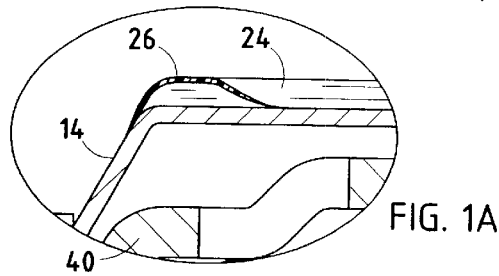
FIG. 1A is a fragmentary cross-sectional view of a portion of the electrochemical cell in FIG. 1.

A preferred embodiment of the invention is shown in FIG. 1. FIG. 1 shows an electrochemical cell 10 that has a cylindrical housing 12, a negative terminal 14, and a positive terminal 16. Negative terminal 14 has an exterior surface 18 which is facing upward in FIG. 1. The central region 20 of negative terminal 14 is slightly recessed below the remaining portion of terminal 14, and is surrounded by a trough 22. Negative terminal 14 further includes a ridge 24 that serves as the raised portion of negative terminal 14. The exterior surface of ridge 24 is coated with an electrically non-conductive material 26 that is permanently secured to the terminal (see FIG. 1A). The central area of the terminal is not coated with the non-conductive material and is thus a conductive region. The thickness of the insulating material is from about 0.001 inch to about 0.005 inch, and preferably from about 0.001 inch to about 0.003 inch. As noted above, the raised portion encloses the central portion of the terminal except for the notches in the raised portion. The radial cross-section of the raised portion may be of any shape, but preferably is the same shape as the radial cross-section of the cell.

The internal components of the electrochemical cell are contained within housing 12. Housing 12 is a sealed cylindrical housing, preferably metallic and a cup-shaped container that is opened at one end and closed at the other end. The internal components include an anode (negative electrode) 30, which is preferably a mixture of a zinc alloy and other additives. The internal components of the cell also include a cathode (positive electrode) 32, which is preferably made of manganese dioxide and additives, a brass nail current collector 34 and a separator 36 between anode 30 and cathode 32. Near the open end of housing 12 is a nylon seal 38 and a cover 40. Terminal 16 is preferably made of a nickel-plated steel or tin-plated steel, and is electrically connected to the cathode 32. Terminal 16 is entirely electrically conductive and includes a protrusion 42. Terminal 16 acts as the positive terminal of the cell.

Figure 2:
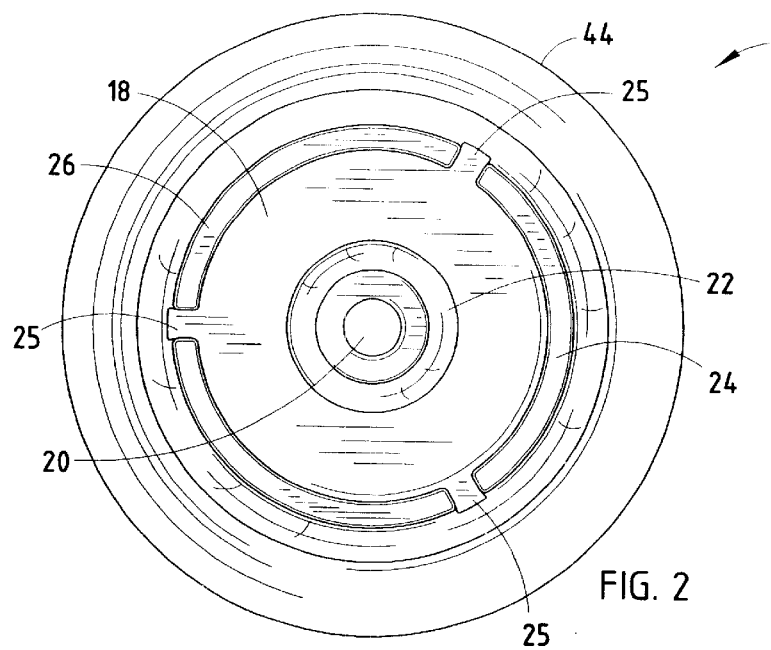
FIG. 2 is a top plan view of the electrochemical cell of FIG. 1.

FIG. 2 shows the negative terminal of electrochemical cell 10 and shows the inclusion of three gaps or notches 25 in the circular raised portion 24. The notches are passageways that allow air ingress toward the center of terminal cover 18 during the coating process of the non-conductive material 26 on to terminal 14, thereby preventing a vacuum and preventing migration of the non-conductive material 26. It is contemplated that fewer or more notches may be used to provide air ingress.

The notches as shown in FIGS. 1 and 2 start at the top of the ridge 24 and extend downward to the flat portion of terminal 14. It is contemplated that the notch or notches may be of any shape or size that allows enough air ingress during the coating process that noticeable migration of the non-conductive material does not occur.

Figure 3:
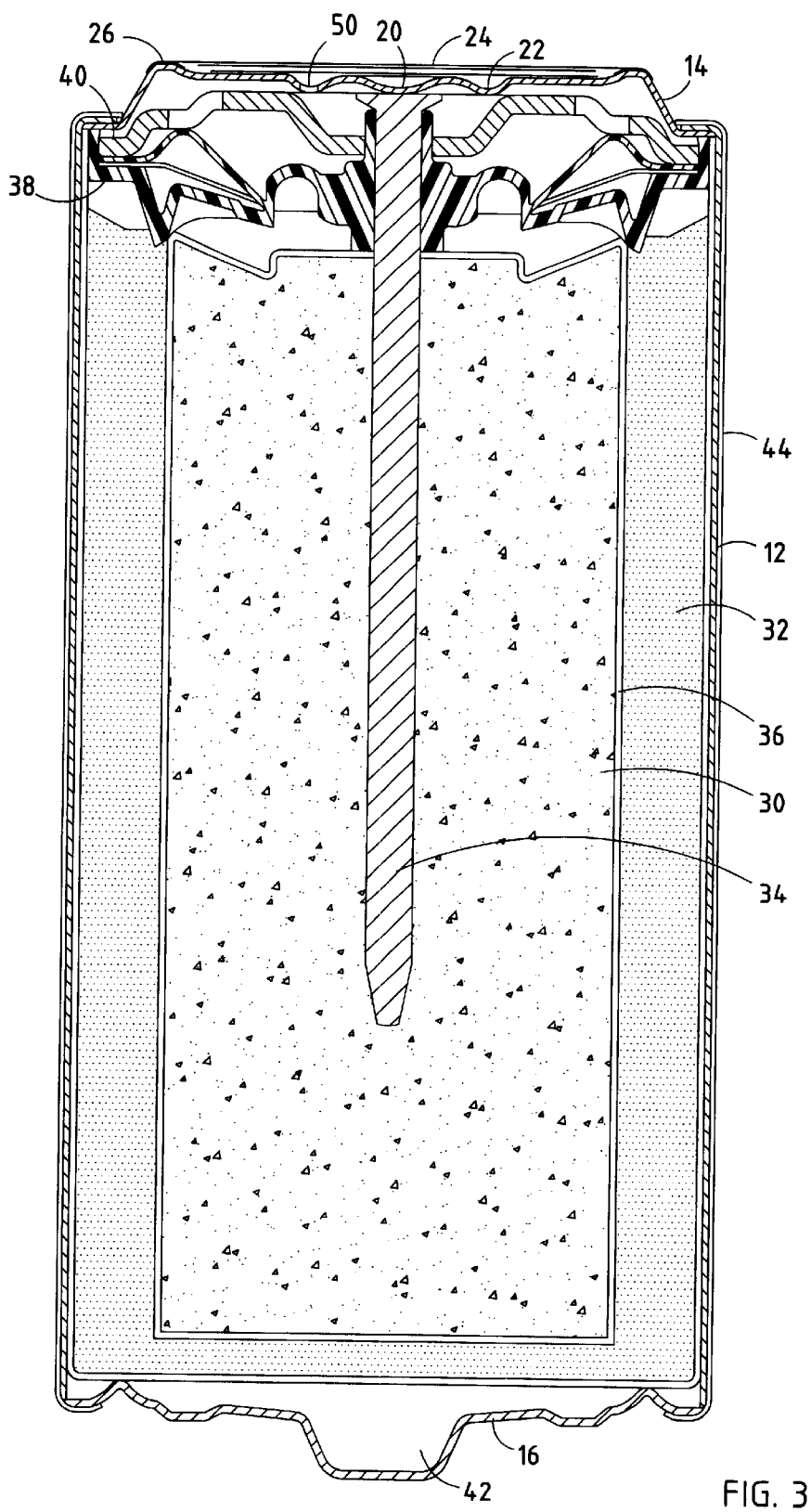
FIG. 3 is a cross-sectional view of an electrochemical cell having a hole near the center of the negative terminal cover.

FIG. 3 shows an alternative embodiment of the present invention. In this embodiment, raised portion 24 does not include notches, but instead a hole 50 is placed in trough 22 of the negative terminal 14 as a passageway to allow air ingress during the coating process. Such a hole 50 is preferably not in the center of terminal 14 when that is the primary contact point between the negative terminal and the current collector.

Figure 4:
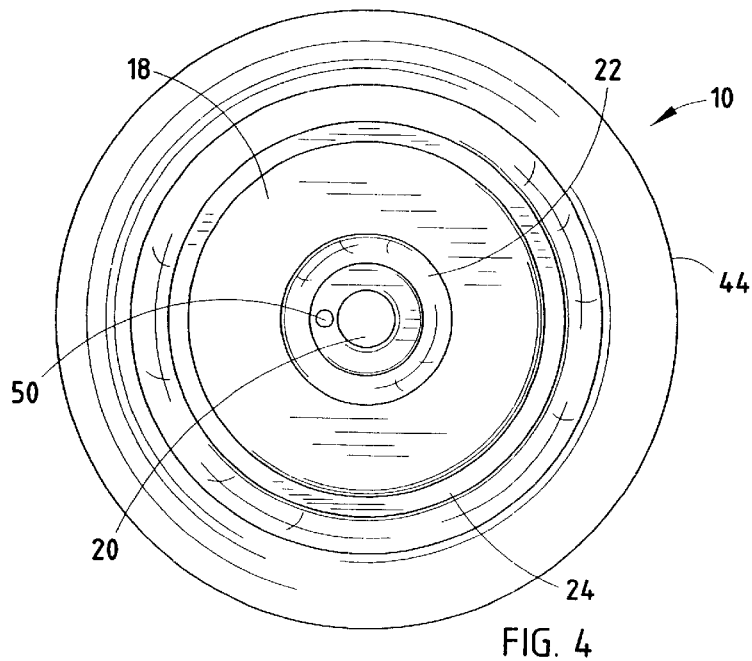
FIG. 4 is a top plan view of the electrochemical cell of FIG. 3.

FIG. 4 is a plan view of the negative terminal with hole 50 therein. FIG. 4 shows the placement of the hole in the trough 22. Placement of hole 50 in trough 22, as opposed to the raised portion or flat surface, obscures the hole from view somewhat, which is desirable.

Figure 5:
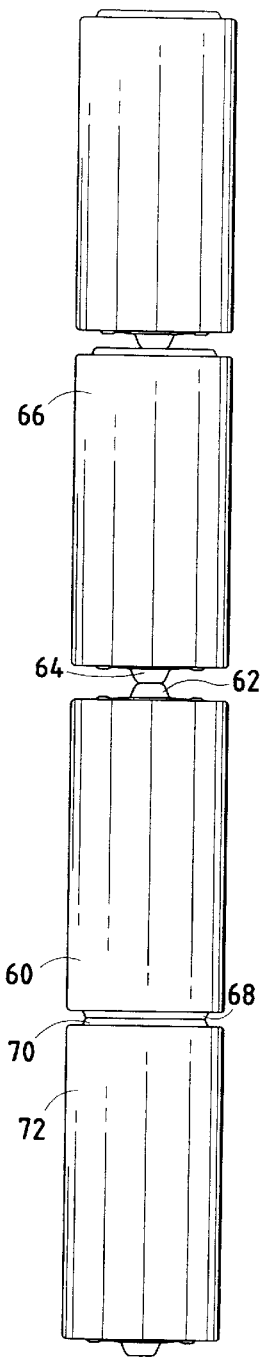
FIG. 5 is an elevational view of four electrochemical cells aligned end-to-end with one cell reversed.

Four cylindrical electrochemical cells, aligned end to end, are shown in FIG. 5. One cell 60 has been reversed so that the positive terminal 62 of cell 60 contacts positive terminal 64 of cell 66 while negative terminal 68 of cell 60 abuts negative terminal 70 of cell 72. Negative terminals 68 and 70 are not capable of conducting an electric current between cells 60 and 72 because the electrically non-conducting material has been applied to the raised portion of terminal 68 and the raised portion of terminal 70.

Terminals useful in electrochemical cells of this invention may be prepared in the following manner. First, the terminal covers are prepared of a metal noted above by machining. Second, the terminal covers are placed on a conveyor belt so that the exterior surface of each terminal faces upward. The belt then carries the terminals beneath a roll coating apparatus which is designed to apply a thin coating of Apscure 2008-195 epoxy resin to only the raised portion of the terminal. The terminals may then be transported by the conveyor belt under a UV light. The speed of the conveyor belt should be selected so that each terminal is exposed to 2700 millijoules/cm$^2$ of ultraviolet energy, using 600 watt lamps. As the terminals exit out from under the ultraviolet light, the epoxy resin will be electrically non-conductive and securely attached to the surface of the terminals. Alternatively, the non-conductive coating may be applied to the terminals after they are attached to the cells.

To construct the cell, cathode 32 is inserted into housing 12 adjacent its perimeter, separator 36 is then inserted on the interior of cathode 32, and the anode mixture 30 is inserted into the center of the housing 12. Electrolyte is added and the seal 38, cover 40, and brass nail current collector 34 are then inserted through the opening in housing 12. The negative terminal cover 40 is then attached to the housing, terminals 14 and 16 are attached, and a label 44 is adhered to the housing 12.

The above description is considered that of the preferred embodiments only. Modifications of the invention will occur to those skilled in the art and to those who make or use the invention. Therefore, it is understood that the embodiments shown above are merely for illustrative purposes and not intended to limit the scope of the invention, which is defined by the following claims as interpreted according to the principles of patent law, including the doctrine of equivalents.

What is claimed is:

1. An electrochemical cell comprising:
    a housing having a first end and second end;
    a first terminal at said first end of said housing;
    a second terminal at said second end of said housing, said second terminal having an exterior surface comprising a substantially flat portion and a raised portion, the uppermost part of which is insulated, and a passageway at or radially inward of said raised portion to allow air ingress to an area outside said external surface and radially inward of said raised portion when a flat structure is placed against said second terminal parallel to said substantially flat portion.

2. The electrochemical cell defined in claim 1, wherein said passageway is at least one notch in said raised portion.

3. The electrochemical cell defined in claim 1, wherein said passageway is at least one hole in said second terminal.

4. The electrochemical cell defined in claim 1, wherein the electrochemical cell is an alkaline cell.

5. The electrochemical cell defined in claim 1, wherein said second terminal is a negative terminal.

6. The electrochemical cell defined in claim 1, wherein the electrochemical cell is cylindrical in shape.

7. An electrochemical cell comprising:
    a housing having a first end and second end;
    a first terminal at said first end of said housing; and
    a second terminal at said second end of said housing, said second terminal having a substantially flat portion and a raised portion, the uppermost part of which is insulated, and air ingress means for allowing sufficient air ingress to avoid migration of a non-conductive coating toward the center of said second terminal from said raised portion during application of said non-conductive material.

8. The electrochemical cell defined in claim 7, wherein said air ingress means is at least one notch in said raised portion.

9. The electrochemical cell defined in claim 7, wherein said air ingress means is at least one hole in said second terminal.

10. The electrochemical cell defined in claim 7, wherein the electrochemical cell is an alkaline cell.

11. The electrochemical cell defined in claim 7, wherein said second terminal is a negative terminal.

12. The electrochemical cell defined in claim 7, wherein the electrochemical cell is cylindrical in shape.

13. An electrochemical cell comprising:
    a housing having a first end and a second end;
    a first terminal at said first end of said housing; and
    a second terminal at said second end of said housing, said second terminal having an exterior surface, said second terminal exterior surface having an electrically non-conductive raised portion, said raised portion having at least one air passageway therein to allow the passage of air into an area outside said cell and radially inward of said raised portion.

14. The electrochemical cell defined in claim 13 wherein said at least one air passageway comprises at least one notch.

15. The electrochemical cell of claim 14 wherein said at least one notch comprises 50% or less of the total length of the uppermost part of said raised portion including said at least one notch.

16. The electrochemical cell defined in claim 15 wherein said at least one notch is three notches.

17. The electrochemical cell defined in claim 16 wherein said electrically insulated raised portion includes a coating to provide the insulation to said raised portion.

18. The electrochemical cell defined in claim 17 wherein said second terminal is a negative terminal.

19. The electrochemical cell defined in claim 18 wherein the electrochemical cell is an alkaline cylindrical cell.

20. The electrochemical cell defined in claim 14 wherein said electrically insulated raised portion includes a coating to provide the insulation to said raised portion.

21. The electrochemical cell defined in claim 20 wherein said insulating coating is a 100% ultraviolet curing epoxy.

22. The electrochemical cell defined in claim 21 wherein said insulating coating has a thickness of from about 0.001 inch to about 0.005 inch.

23. The electrochemical cell defined in claim 22 wherein said insulating coating has a thickness of from about 0.001 inch to about 0.003 inch.

24. An electrochemical cell comprising:

a housing having a first end and a second end;

a first terminal at said first end of said housing; and a second terminal at said second end of said housing, said second terminal having an exterior surface, said second terminal exterior surface having an electrically insulated raised portion, said second terminal having at least one hole therein between the radial center of said second terminal and a crest of said raised portion.

25. The electrochemical cell defined in claim 24, wherein said raised portion is circular.

26. The electrochemical cell defined in claim 25, wherein said second terminal includes a central trough and said at least one hole is located in said central trough.

27. The electrochemical cell defined in claim 26 wherein said electrically insulated raised portion comprises a 100% UV curable epoxy.

28. The electrochemical cell defined in claim 27 wherein said insulating coating has a thickness of from about 0.001 inch to about 0.005 inch.

29. The electrochemical cell defined in claim 28 wherein said insulating coating has a thickness of from about 0.001 inch to about 0.003 inch.

30. The electrochemical cell defined in claim 13, wherein:

said housing is a cylindrical housing;

internal components including an anodic material, a cathodic material, and an alkaline electrolyte are contained in said housing;

said first terminal is a positive terminal;

said second terminal is a negative terminal; and said at least one air passageway comprises a plurality of notches in said raised portion.

31. The electromechanical cell defined in claim 30, wherein the only part of said exterior surface of said negative terminal that is covered by a non-conductive material is said raised portion.

* * * * *